(12) United States Patent
Hassanin et al.

(10) Patent No.: US 7,073,137 B2
(45) Date of Patent: Jul. 4, 2006

(54) SYSTEM AND METHOD FOR USER INTERFACE MIRRORING UTILIZING A LAYOUT MANAGER

(75) Inventors: Mohamed Abdel Hamid Hassanin, Redmond, WA (US); Jeffrey L. Bogdan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 09/755,982

(22) Filed: Jan. 5, 2001

(65) Prior Publication Data

US 2004/0225967 A1  Nov. 11, 2004

Related U.S. Application Data

(60) Provisional application No. 60/244,483, filed on Oct. 30, 2000.

(51) Int. Cl.
G06F 3/00 (2006.01)
(52) U.S. Cl. ........................ 715/853; 715/762
(58) Field of Classification Search .......... 345/703, 345/760–764, 334–335, 356; 715/513–517, 715/762
See application file for complete search history.

(56) References Cited

U.S. PATENT DOCUMENTS 5,911,145 A * 6/1999 Arora et al. ............... 715/514
6,750,887 B1 * 6/2004 Kellerman et al. ......... 715/788
6,778,992 B1 * 8/2004 Searle et al. ............... 707/101

* cited by examiner

Primary Examiner—Kristine Kincaid
Assistant Examiner—Lê Nguyen
(74) Attorney, Agent, or Firm—Christensen O'Connor Johnson Kindness PLLC

(57) ABSTRACT

A system and method for user interface mirroring are provided. User interface objects are defined according to an object hierarchy that defines a logical relationship between a root element and one or more child elements. Additionally, the root element includes a directional property that is inherited by the child elements. A layout manager obtains the logical relationship and the specified directional property and correlates a set of physical coordinates for each display object according to the directional property, while maintaining the logical relationship. A renderer renders each of the display objects according to the specified directional property, while maintaining a truth table for graphical resources that could be rendered in one or more directions.

23 Claims, 5 Drawing Sheets

| GRAPHIC FLIPPABLE? | GRAPHIC IS RTL? | ELEMENT IS RTL? | FLIP GRAPHIC? |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 0 |

| GRAPHIC FLIPPABLE? | GRAPHIC IS RTL? | ELEMENT IS RTL? | FLIP GRAPHIC? |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 0 |
| 1 | 0 | 1 | 1 |
| 1 | 1 | 0 | 1 |
| 1 | 1 | 1 | 0 |

*Fig.4.*

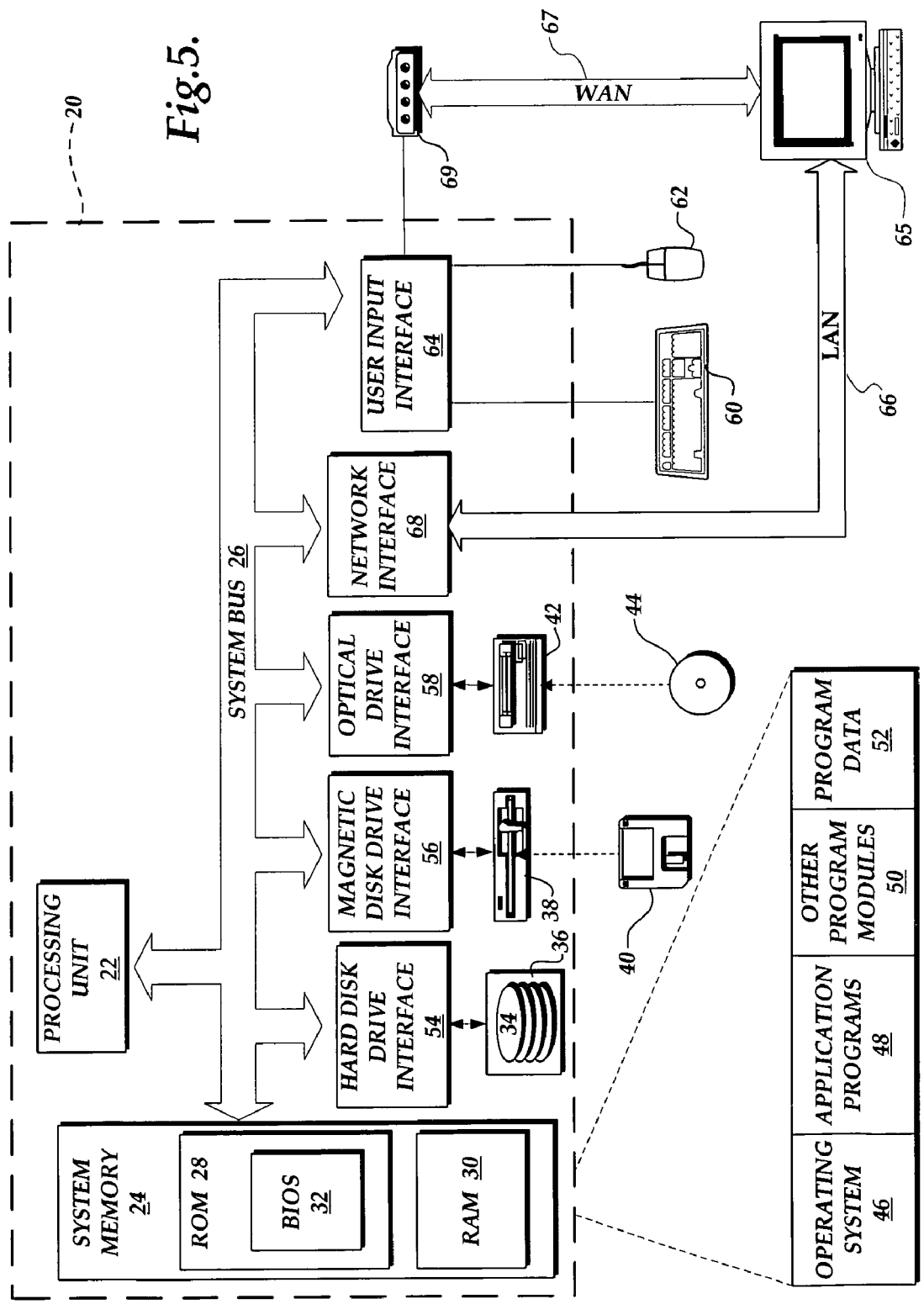

SYSTEM AND METHOD FOR USER INTERFACE MIRRORING UTILIZING A LAYOUT MANAGER

RELATIONSHIP TO OTHER APPLICATIONS

This application claims the benefit of U.S. Provisional Application No. 60/244,483 filed Oct. 30, 2000. Provisional Application No. 60/244,483 is specifically incorporated herein by reference.

FIELD OF THE INVENTION

In general, the present application relates to computer software, and in particular, to a system and method for providing directional properties to user interface objects.

BACKGROUND OF THE INVENTION

Generally described, the ability for a common user interface to be accessible to a variety of users is necessary for the distribution of the common user interface in a global marketplace. For example, to facilitate use of the common user interface in different countries/regions, the user interface should support multiple languages. In the simplest form, a software provider can provide multiple language user interfaces by manually customizing the user interface software code to satisfy the specific language requirements of each supported language. This approach is generally inefficient, however, in that the software provider must maintain separate software code bases for each of the supported languages. Accordingly, the software provider must independently support each separate software code base, such as providing technical support, providing updates, and/or providing patches.

Another attempt to expand the languages supported by a user interface utilizes a common user interface software code base in conjunction with various language-specific resource libraries. One such system is Microsoft Corporation's multilingual user interface ("MUI"). Generally described, under MUI, the operating system includes a common user interface code base and a default resource module that serves as a default language for the user interface. Additionally, the operating system maintains a number of alternative language-specific resource modules for displaying some or all the user interface objects in an alternative language. Accordingly, if a user specifies one of the non-English language supported by MUI, the operating system loads the resources from the corresponding alternative language resource module.

While use of language-specific resource library files, such as an operating system implementing MUI, increases the number of languages that can be supported by a common user interface, language-specific library files are still inefficient in allowing the common user interface to be adapted for some languages. For example, some languages, such as Arabic or Hebrew, follow a right to left ("RTL") language reading direction. If a common user interface is laid out in languages that utilize a left to right ("LTR") language reading direction, such as in Spanish, French, or English, a mere translation of words composed in a language following a LTR language reading direction, does not suffice to make the user interface understandable in a language following a RTL language reading direction.

Thus, there is a need for a common user interface that is capable of mirroring user interface objects for language reading direction conversion.

SUMMARY OF THE INVENTION

A system and method for user interface mirroring are provided. User interface objects are defined according to an object hierarchy that defines a logical relationship between a root element and one or more child elements. Additionally, the root element includes a directional property that is inherited by the child elements. A layout manager obtains the logical relationship and the specified directional property and correlates a set of physical coordinates to each display object according to the directional property, while maintaining the logical relationship. A renderer renders each of the display objects according to the specified directional property, while maintaining a truth table for graphical resources that could be rendered in one or more directions.

In accordance with one aspect of the present invention, a method for processing a directional property in a display object is provided. In accordance with the method, a layout manager obtains an object hierarchy having a root element and one or more child elements and that defines a logical relationship between each object hierarchy element. The layout manager associates a directional property for the object hierarchy. Additionally, the layout manager generates a set of physical coordinates corresponding to a display screen for each element in the object hierarchy. The physical coordinates also correspond to the logical relationship between the object hierarchy elements and the directional property associated with the object hierarchy.

In another aspect of the present invention, computer-readable medium having computer-executable components for processing a directional property is provided. The computer-executable components include a layout component for accepting an object hierarchy having a root element and one or more child elements defined according to a logical relationship. The layout component is operable to generate a set of physical coordinates for the object hierarchy corresponding to the logical relationship and a directional property for the object hierarchy.

In a further aspect of the present invention, a method for processing a direction property in a display object is provided. A renderer obtains a display object including a graphical resource and including rendering information to determine whether the graphical resource can be rendered in a specific direction. The renderer also obtains a specified directional property specified for the display object. The renderer determines whether the display object can be rendered according to the specified directional property

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A is a block diagram illustrative of a bounded rectangle grid layout configuration implemented by a layout manager in accordance with the present invention;

FIG. 3B is a block diagram illustrative of a bounded rectangle flow layout configuration implemented by a layout manager in accordance with the present invention;

FIG. 3C is illustrative of the bounded grid layout of FIG. 3A adjusted by a layout manager to reflect a RTL language reading direction in accordance with the present invention;

FIG. 4 is illustrative of a truth table for determining whether a graphical resource should be mirrored in accordance with the present invention;

FIG. 5 is a block diagram of a computer system suitable for implementing the present invention.

DETAILED DESCRIPTION OF THE PREFERRED EMBODIMENT

Figure 1A:
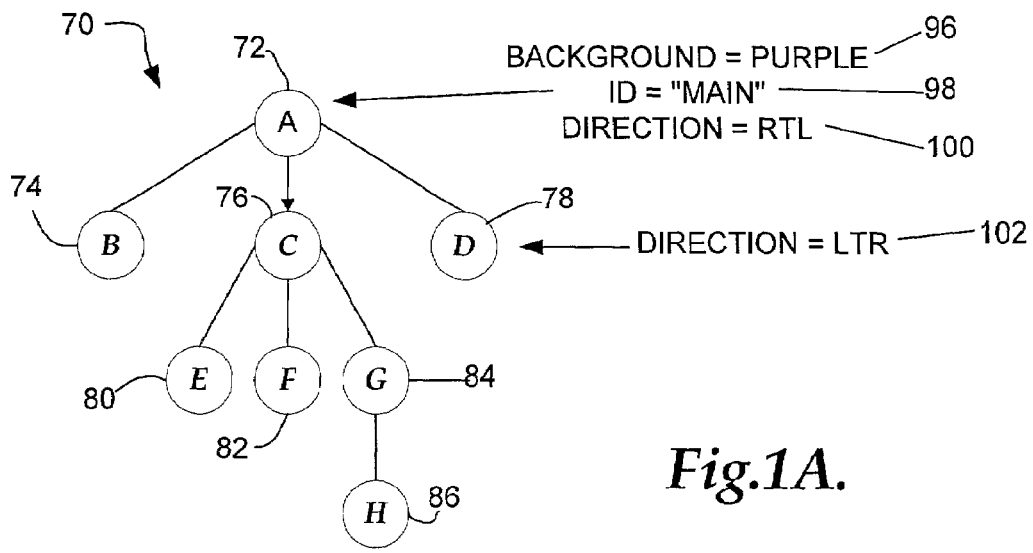
FIG. 1A is block diagram illustrative of a display object hierarchy utilized in accordance with the present invention.

FIG. 5 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations. Example of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems, or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media, including memory storage devices.

With reference to FIG. 5, an exemplary system for implementing the invention includes a general purpose-computing device in the form of a computer 20. Components of a computer 20 include, but are not limited to, a processing unit 22, a system memory 24, and a system bus 26 that couples various system components, including the system memory, to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 5 illustrates an operating system 46, application programs 48, other program modules 50, and program data 52.

The computer 20 may also include removable/non-removable, volatile/non-volatile computer storage media. By way of example only, FIG. 5 illustrates a hard disk drive 34 that reads from or writes to non-removable, non-volatile magnetic media 36, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associated computer storage media discussed above and illustrated in FIG. 5, provide storage of computer-readable instructions, data structures, program modules and other data for the computer 20. In FIG. 5, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 5. The logical connections depicted in FIG. 5 include a local area network (LAN) 66 and a wide area network (WAN) 67, but also include other networks. Such network environments are commonplace in office, enterprise-wide computer networks, intranets, and the Internet. It will be appreciated by one skilled in the relevant art that the computer 20 may be configured such that at least one network connection is non-continuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 66 through a network interface adapter 68. When used in a WAN network environment, the computer typically includes a modem 69 or other means for establishing communications over the WAN 67, such as the Internet. The modem 69, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 5 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to load the operating system from the hard disk drive 34 into the RAM 30. Once the operating system 46 is loaded into RAM 30, the processing unit executes the operating system code and causes the visual elements associated with the user interface of the operating system to be displayed on the monitor 65. When an application program 48 is opened by a user, the program code and relevant data are read from the hard disk drive and stored in RAM 38.

The present invention provides a system and method for implementing a common user interface capable of mirroring user interface objects. In accordance with an actual embodiment, the present invention will be described in relation to a user interface for mirroring user interface objects according to a RTL or LTR language reading direction. It will be readily understood by one skilled in the relevant art, that the disclosed embodiment is only done by way of example and should not be construed as limiting.

In one aspect, the present invention provides an object hierarchy that facilitates the inheritance of a root element direction property by each element in the object hierarchy. FIG. 1A is block diagram illustrative of a display object hierarchy 70 utilized in accordance with the present invention. Generally described, a display object hierarchy 70 includes a root element 72, "A", followed by a number of child elements, namely 74, 76, 78, 80, 82, 84, and 86. As illustrated in FIG. 1A, the object hierarchy 70 is illustrated as a tree data structure in which the root element 72 includes three direct child elements, 74, 76, and 78. Furthermore, child element 76 includes three additional child elements 80, 82, and 84. Finally, child element 84 also has a single child element 86.

Figure 1B:
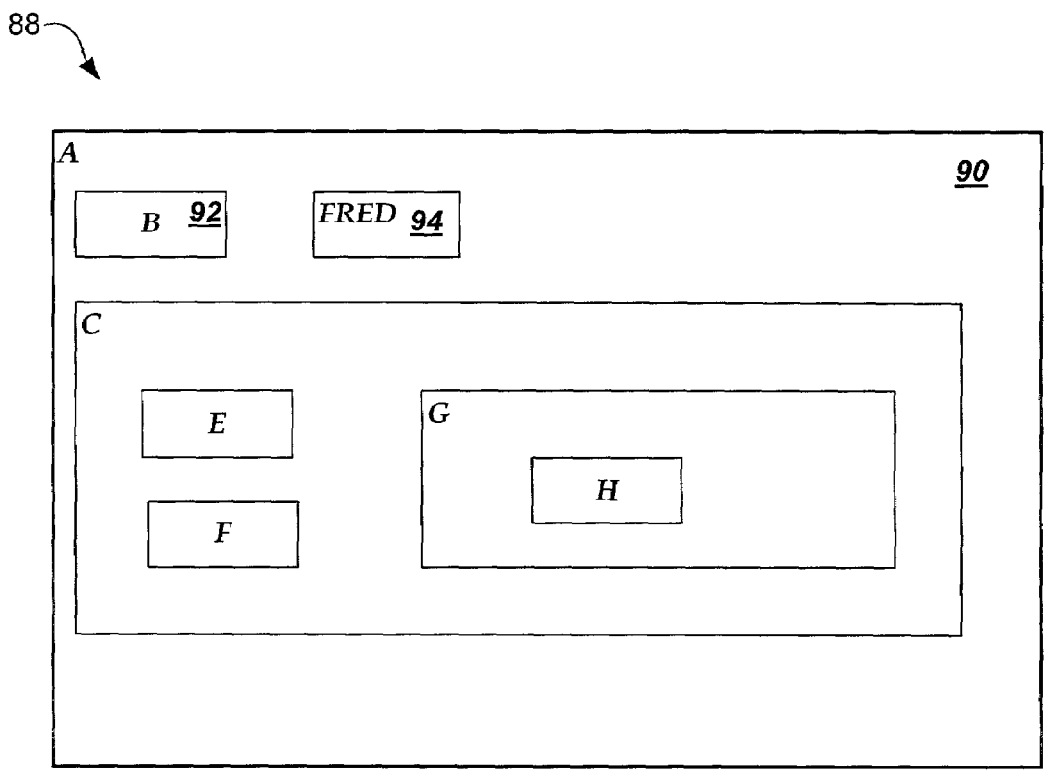
FIG. 1B is a block diagram illustrative of a screen display corresponding to the object hierarchy of FIG. 1A.

As utilized in the present invention, each element corresponds to a display object generated for a user interface. FIG. 1B is a block diagram illustrative of a user interface display 88 having display objects corresponding to the object hierarchy 70 of FIG. 1A. As illustrated in FIG. 1B, display object 90 corresponding to root element 72, display object 92 corresponds to element 74, and display object 94 corresponds to display object 78.

Returning to FIG. 1A, the root element 72 of the object hierarchy 70 is defined with various properties. For example, root element 72 includes a background color property 96, an object ID property 98, and a direction property 100. In accordance with the present invention, elements within an object hierarchy are capable of inheriting some or all of the properties of the elements higher up in the hierarchy. In the illustrative embodiment of the present invention, it will be assumed that the background property 96 and directional property 100 are inheritable, but the object ID 98 property is not. Thus, if the root element 76 is defined with a background property 96 of "purple" and an "RTL" directional property 100 to indicate that the root element is to be rendered having a right to left language reading direction, these properties can be inheritable by at least some of the child elements within the object hierarchy 70. Thus, as illustrated in FIG. 1A, child elements 74, 76, 80, 82, 84, and 86 would all inherit the background property 96 and the directional property 100 from the root element 72.

However, as further illustrated in FIG. 1A, while the child elements can inherit various properties from the root element 72, a child element, such as child element 78, may also be defined with its own properties, such as directional property 102, which may not be the same as the directional property 100 of the root element 72. In the illustrative embodiment, while child element 78 inherits the background property 96 of the root element, it does not inherit the root element's directional property 100 because a specific directional property 102 has been specified for that element. Thus, the inheritance of directional properties facilitates the control of a user interface by specifying a single root element property, while allowing some specific display object properties to be specified.

Generally described, an operating system includes a layout manager and a renderer for processing display objects, such as user interface display objects. For example, a layout manager accepts display object layout properties and generates the placement of each object by specifying physical coordinates for the objects on a display screen. Additionally, a renderer, such as a box renderer, accepts display layout properties for display objects and generates each display object on the display screen according to the physical coordinates set out by the layout manager. The function of layout managers and renderers will be understood by one skilled in the relevant art and will not be explained in greater detail.

Figure 2A:
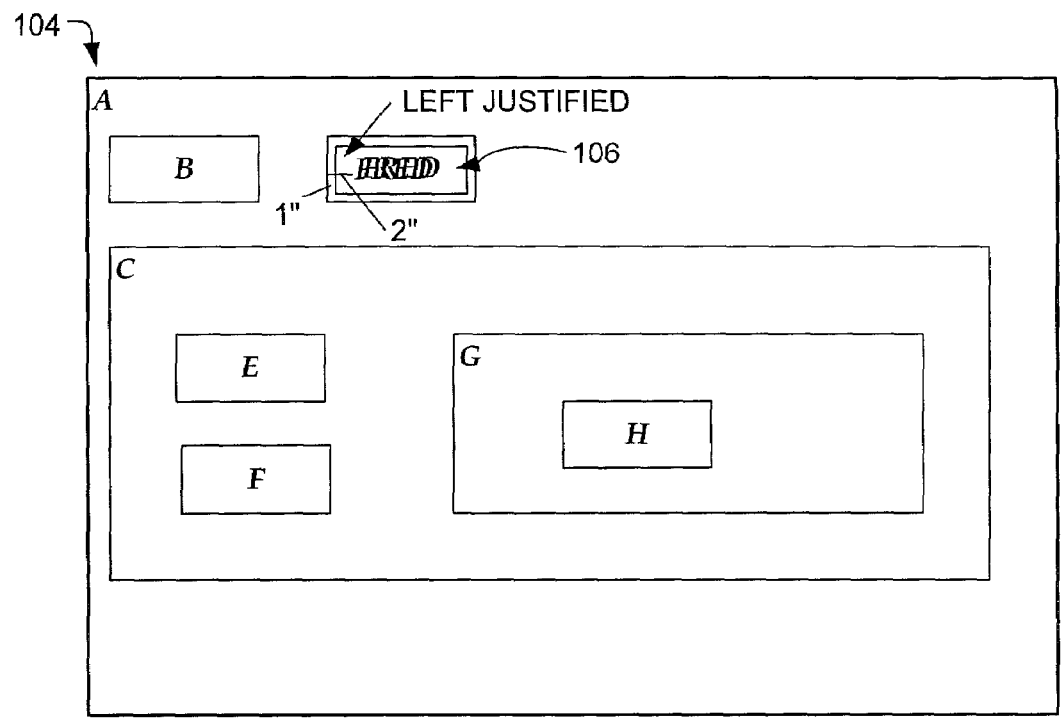
FIG. 2A is illustrative of a display screen in which a display object having a left to right language reading direction is rendered with three display object parameters.

In another aspect of the present invention, once specified, a renderer, such as a box-rendering model, honors a directional property of an element when rendering individual display objects. In an illustrative embodiment of the present invention, display objects, such as display object 78 (FIG. 1A), may be specified with display layout properties such as "content align=top left", "padding=2, 5, 6, 10", "text string FRED" and/or "border=1, 1, 1, 1". FIG. 2A is a block diagram 104 of the display screen of FIG. 1B illustrating a display object 106 having a LTR language reading direction and rendered with the three above-mentioned display layout properties. As illustrated in FIG. 2A, "content align=top left" specifies that all text strings should begin in the left-hand side of the object, "padding=2, 5, 6, 10" specifies padding dimensions from the left, top, right, and bottom of the display object, "text string=FRED" specifies the content of the text string to be inserted in the drawing object, and "border=1, 1, 1, 1" specifies that drawing object should have a 1 unit border. Accordingly, the box renderer renders the display objects with the display layout properties, including an indicated directional property. One skilled in the relevant art will appreciate that any one of variety of display layout properties may be utilized with the present invention.

Figure 2B:
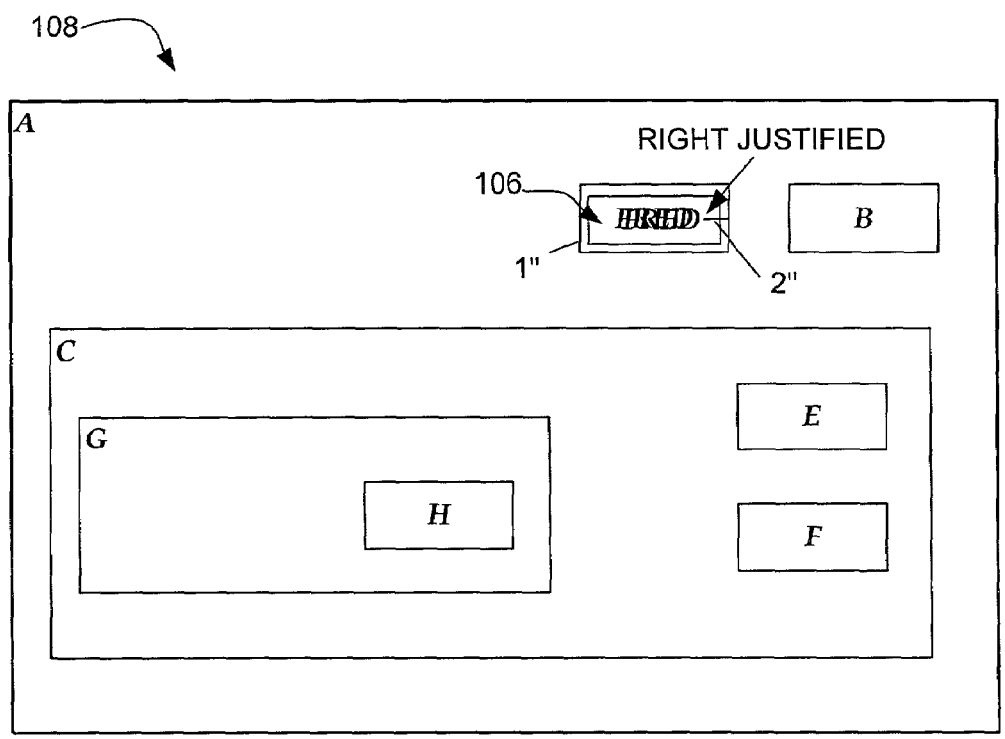
FIG. 2B is illustrative of a display screen in which a display object having a right to left language reading direction is rendered with three display object parameters.

In an actual embodiment of the present invention, in the event display object 106 is to be rendered as display object with a RTL language reading direction, the box renderer honors the directional property by adjusting the reference point of the display object corresponding to the specified language reading direction. FIG. 2B is a block diagram 108 illustrative of the display screen 104 of FIG. 2A, in which the display objects, including display object 106, have a RTL language reading direction. In this illustrative embodiment, although the directional property of the display object 106 has changed, the display object 106 retains its other specified layout properties. For example, the "content align" property is rendered such that the content is now aligned in the top right corner of the display object. Additionally, the "padding=2, 5, 6, 10" property specifies padding dimensions from the left, top, right, and bottom of the display object respectively. As will be explained in greater detail below, however, note that some properties, such as the "text string=FRED" property, does not change because the parameter does not change with a change in the specified language reading direction.

In a further aspect of the present invention, an operating system layout manager is configured to honor a directional property specified for the display elements in performing layout calculations. Generally described, layout managers are utilized in manner to minimize the number layout calculations required by an application author to specify a display object. For example, an application author defines an object hierarchy having a root element and its child elements and then utilizes the layout manager to lay out the elements. Accordingly, the application author may change the display by specifying a different configuration and allow the layout manager to change the physical layout of the display objects on the display screen. This configuration relieves the application author from tracking the element children and facilitates changing a layout configuration.

Figures 3A, 3B, 3C:
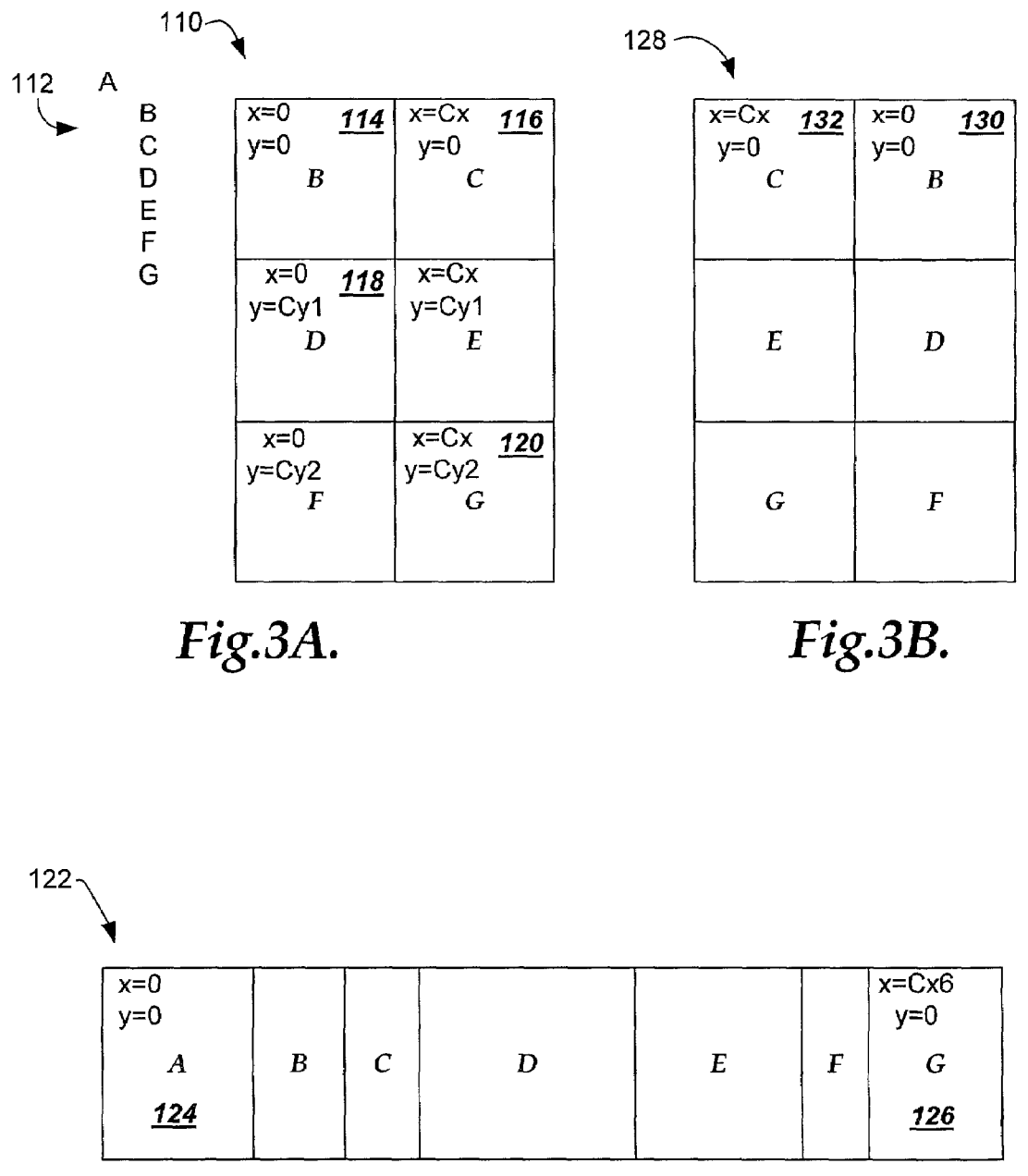

FIG. 3A is a block diagram illustrative of a grid layout 110 of display objects implemented by a layout manager in accordance with the present invention. As illustrated in FIG. 3A, at 112, a parent element, "A" defines six child elements "B"–"G". Accordingly, in a grid layout 110, the layout manager defines each child element by a bounding rectangle organized as grid blocks within a display area. In an illustrative embodiment of the present invention, the layout manager establishes the grid layout 110 such that each child element bounded rectangle is equal to cover the display space assigned to the display objects. With reference to FIG. 3A, bounded rectangle 114 is defined by the logical coordinates "x=0" and "y=0" to signify that the bounded rectangle is in the upper left-hand corner of the grid 110. Bounded rectangle 116 is defined by the logical coordinates "x=Cx" and "y=0", where Cx is defined as a point along the x-axis of the grid 110 that is a function of the total width of the x-axis. In an illustrative embodiment of the present invention, equation (1) defines Cx so that the bounded rectangles are equal as follows:

$$Cx = \text{Width of Grid}/2 \qquad (1)$$

Accordingly, one skilled in the art will appreciate that by making Cx variable, the layout manager can preserve the relationship between the bounded rectangles for any one of a variety of grid sizes.

With continued reference to FIG. 3A, bounded rectangle 118 is defined by the logical coordinates "x=0" and "y=Cy1", where Cy1 is defined as a point along they y-axis of the grid 110 that is a function of the total length of the y-axis. In an illustrative embodiment, equation (2) defines Cy1 so that the bounded rectangles such that three bounded rectangles fit within the grid 110 as follows:

$$Cy1 = \text{Length of Grid}/3 \qquad (2)$$

Similarly, bounded rectangle 120 is defined by the logical coordinates "x=Cx" and "y=Cy2", where Cy2 is defined as a point along the y-axis of the grid 110 that is a function of the total length of the y-axis. Accordingly, the layout manager correlates physical display coordinates to each bounded rectangle based on an evaluation of the logical coordinates.

In another illustrative embodiment of the present invention, the layout manager defines each child element by a bounding rectangle organized as a flow layout. FIG. 3C is a block diagram of a flow layout 122 of display objects implemented by a layout manager in accordance with the present invention. As illustrated in FIG. 3C, the layout manager establishes the flow layout 122 such that each child element is defined by a bounding rectangle organized in a horizontal row. In this embodiment, each bounded rectangle is not equal in size, but are generated such that the space covers the horizontal space assigned to the display objects. For example, bounded rectangle 124 is defined by the coordinates "x=0" and "y=0" to signify that the bounded rectangle is the left most bounded rectangle. On the other hand, bounded rectangle 126 is defined by the coordinates "x=Cx6" and "y=0", where Cx6 is defined as a point along the x-axis of the grid 122 that is a function of the total length of the x-axis. Because the flow layout 122 is concerned with horizontal placement, the y-coordinate for the bounded rectangles does not change. One skilled in the art will appreciate that any one of a variety of layouts may be utilized by a layout manager, including, but not limited to the combination of both grid and flow layouts, border layouts, fill layouts, vertical flow layouts, ninegrid layouts, and any variety of extensible layout configuration.

In accordance with the present invention, a layout manager is configured to adjust the layout of each child element according to an indicated language direction of its parent element. As explained above, the parent element, "A" defines each child element bounded rectangle in terms of logical coordinates that define the relationship between the child elements and that are agnostic to the language reading direction. Additionally, as explained above, the parent element also defines a directional property that is inherited by each child element. Accordingly, upon obtaining the logical coordinates of the child elements and a language reading direction, the layout manager then generates a layout based on the language reading direction, while preserving the bounded rectangle relationship specified in the logical coordinates.

FIG. 3B is a block diagram 128 illustrative of the grid layout 110 of FIG. 3A adjusted by a layout manager to reflect a RTL language reading direction in accordance with the present invention. As illustrated in FIG. 3A, the layout manager maintains the relationship between the bounded rectangles irrespective of the directional property being implemented. For example, bounded rectangle 130, corresponding to bounded rectangle 114 (FIG. 3A), is still defined by the coordinates "x=0" and "y=0" even the direction of the x-axis has reversed. Likewise, bounded rectangle 132 is still defined by the coordinates "x=Cx" and "y=0". However, one skilled in the relevant art will appreciate that the layout manager correlates these logical coordinates to different physical coordinates within the display screen. Thus, once an application author defines the display objects in terms of logical coordinates, the layout manager correlates physical coordinates depending on an indicated language reading direction.

In yet another aspect of the present invention, some display object including graphical resources such as bitmaps, icons, and cursors further include directional properties to instruct the renderer how to render the particular graphical resource. As described above, a layout manager allows for the layout of display objects relative to one another. Additionally, a renderer allows for the honoring of a directional property in the rendering of additional display object properties. However, some graphical resources are unique in that they cannot change directional property regardless of the directional property specified for the display object hosting graphical resource. For example, assume a display object is defined as including a bitmap image of a company logo that must remain uniquely in an RTL language reading direction. If the display object is specified as having an RTL language reading direction, the renderer displays the drawing object as specified. However, if the display object property is changed to have an LTR language reading direction, the renderer attempts to render the graphical resource by changing its direction. However, in the case of the company logo, rendering the display object with an LTR would be an error.

To mitigate the rendering of non-mirrorable display object, the present invention provides each graphical resource with information indicating whether the resource can be mirrored and what direction the resource was authored in. Specifically, the present invention utilizes a truth table that establishes whether a display object can be rendered with a different directional property. FIG. 4 is a block diagram 134 of a truth table utilized in accordance with the present invention. As illustrated in FIG. 4, the table 134 includes a column 136 for indicating whether the graphic resource is mirrorable, a column 138 whether the graphic resource was authored as an RTL object, a column 140 whether the display object has been defined as being RTL and a column 142 that determines whether the graphic resource has to be mirrored. One skilled in the relevant art will appreciate that any one of a variety of data structures can be utilized with the present invention to track whether a graphical resource, or other resource, can be mirrored. All are considered to be within the scope of the present invention.

As illustrated in FIG. 4, in an actual embodiment of the present invention, the information in the truth table 134 is represented as individual bits with a "0" defining a negative state and a "1" defining a positive state. With reference to FIG. 4, at row 144, the graphical resource is defined as not mirrorable, as not RTL, and that the display object is not RTL. Accordingly, at block 146, the truth table 134 generates a result that the graphical resource should not be mirrored. However, at row 148, the graphical resource is mirrorable, not defined as RTL, but the display object is defined as RTL. Thus, the truth table 134 at block 150 defines that the graphical resource may be mirrored.

The present invention provides a system and method for mirroring display objects for a common user interface. Specifically, the present invention utilizes display objects organized in a hierarchy that allows child elements to inherit directional properties from a parent element. Additionally, the present invention utilizes a renderer that honors a directional property in rendering individual display objects and that utilizes a truth table to preserve directional properties for some graphical resources. Moreover, the present invention utilizes a layout manager that accepts logical coordinates to define the relationship between display objects, while honoring a directional property inherited by a parent element in correlating physical coordinates to the display objects.

While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. A method for processing a directional property in a display object the method comprising:
   obtaining an object hierarchy having a root element and one or more child elements, wherein the object hierarchy defines a logical relationship between each object hierarchy element;
   associating a directional property for the elements in the object hierarchy;
   generating a set of physical coordinates corresponding to a display screen for each element in the object hierarchy, wherein the physical coordinates correspond to the logical relationship between the object hierarchy elements and the directional property associated with each element.

2. The method as recited in claim 1, wherein the logical relationship between each display object is a grid layout.

3. The method as recited in claim 1, wherein the logical relationship between each display object is a flow layout.

4. The method as recited in claim 1, wherein the logical relationship between each display object is an extensible layout.

5. The method as recited in claim 1, wherein the directional property is a language reading direction.

6. The method as recited in claim 5, wherein the language reading direction is a left to right language reading direction.

7. The method as recited in claim 1, wherein associating a directional property for the object hierarchy includes obtaining a directional property from the root element and associating the directional property for each child element.

8. The method as recited in claim 1 further comprising rendering each display object according to the physical coordinates.

9. The method as recited in claim 8, wherein at least one display object includes one or more layout properties and wherein rendering each display object includes rendering layout properties of display objects.

10. The method as recited in claim 9, wherein rendering the layout properties of display objects including rendering the layout properties according the directional property of the object hierarchy.

11. The method as recited in claim 10, wherein some display objects cannot be rendered in at least one directional property, the method further comprising maintaining a truth table indicating whether a display object can be rendered in a direction.

12. A computer-readable medium having computer-executable instructions for performing the method recited in any one of claims 1–11.

13. A computer system having a processor, a memory and an operating system, the computer system operable for performing the method recited in any one of claims 1–11.

14. A computer-readable medium having computer-executable components for processing a directional property comprising a layout component for accepting an object hierarchy having a root element and one or more child elements defined according to a logical relationship, the layout component operable to generate a set of physical coordinates for the object hierarchy corresponding to the logical relationship and a directional property for each elements in the object hierarchy.

15. The computer-readable medium as recited in claim 14 further comprising a rendering component operable to render object hierarchy according to the physical coordinates and operable to render one or more layout properties of the object hierarchy according to the directional property of the object hierarchy.

16. The computer-readable medium as recited in claim 15, wherein the rendering component includes rendering information to determine whether one or more display objects may be rendered in a specific direction.

17. The computer-readable medium as recited in claim 16, wherein the rendering information is maintained in a truth table.

18. A method for processing a direction property in a display object, the method comprising:
   obtaining a display object including a graphical resource, wherein the display object includes rendering information to determine whether the graphical resource can be maintained in a specific direction;
   obtaining a specified directional property specified for the display object;
   determining whether the display object can be rendered according to the specified directional property.

19. The method as recited in claim 18, wherein the rendering information includes an original direction of the graphical resource and an indication of whether the graphical resource may be rendered in a different direction.

20. The method as recited in claim 19, wherein determining whether the display object can be rendered according to the specified directional property includes a comparison of the indication of whether the graphical resource may be rendered in a different direction if the original direction of the graphical resource and the specified directional property are not equal.

21. The method as recited in claim 20, wherein the comparison is conducted in a truth table.

22. A computer-readable medium having computer-executable instructions for performing the method recited in any one of claims 18–21.

23. A computer system having a processor, a memory and an operating environment, the computer system operable for performing the method recited in any one of claims 18–21.

* * * * *